United States Patent
Jeong et al.

(10) Patent No.: US 9,160,784 B2
(45) Date of Patent: Oct. 13, 2015

(54) REMOTE MANAGEMENT SYSTEM, REMOTE MANAGEMENT METHOD, AND MONITORING SERVER

(75) Inventors: Woo-cheol Jeong, Changwon (KR); Goo-ho Kang, Changwon (KR); Ho-jung Lee, Changwon (KR); Jong-myoung Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 338 days.

(21) Appl. No.: 13/274,784

(22) Filed: Oct. 17, 2011

(65) Prior Publication Data

US 2012/0092447 A1 Apr. 19, 2012

(30) Foreign Application Priority Data

Oct. 15, 2010 (KR) .................. 10-2010-0100754
Oct. 12, 2011 (KR) .................. 10-2011-0103890

(51) Int. Cl.
*H04N 5/225* (2006.01)
*H04L 29/08* (2006.01)
*H04L 12/58* (2006.01)
*H04N 7/18* (2006.01)

(52) U.S. Cl.
CPC .............. *H04L 67/025* (2013.01); *H04L 51/08* (2013.01); *H04L 51/18* (2013.01)

(58) Field of Classification Search
CPC ......... H04N 7/18; H04N 5/225; H04N 5/445; G06F 15/16; H04L 67/22; H04L 63/02; H04L 67/06; H04L 63/123; H04L 1/16

USPC ........ 348/36, 207, 211.11, 143, 372, E07.085
See application file for complete search history.

(56) References Cited

U.S. PATENT DOCUMENTS

| | | | |
|---|---|---|---|
| 6,321,336 B1 * | 11/2001 | Applegate et al. .............. | 726/11 |
| 6,335,742 B1 * | 1/2002 | Takemoto ..................... | 715/781 |
| 6,985,620 B2 | 1/2006 | Sawhney et al. | |
| 7,460,149 B1 * | 12/2008 | Donovan et al. ............. | 348/143 |
| 7,739,334 B1 * | 6/2010 | Ng et al. ...................... | 709/206 |
| 7,792,256 B1 * | 9/2010 | Arledge et al. ........... | 379/102.01 |
| 7,886,048 B1 * | 2/2011 | Holland et al. ............... | 709/224 |
| 8,520,068 B2 * | 8/2013 | Naidoo et al. ................ | 348/143 |

(Continued)

FOREIGN PATENT DOCUMENTS

| | | | |
|---|---|---|---|
| JP | 2000-134522 A | 5/2000 | |
| JP | 2003-233558 A | 8/2003 | |

(Continued)

OTHER PUBLICATIONS

Communication dated Sep. 20, 2011, from the Korean Intellectual Property Office issued in counterpart Korean Application No. 10-2010-0100754.

*Primary Examiner* — Dave Czekaj
*Assistant Examiner* — Dramos I Kalapodas
(74) *Attorney, Agent, or Firm* — Sughrue Mion, PLLC

(57) ABSTRACT

A remote management system, a remote management method, and a monitoring server are provided. The remote management system includes at least one camera which captures at least one of a moving image and a still image of a remote place; a storage unit which stores the captured image; a control unit which controls operation of the at least one camera; and a communication unit which transmits to a device selectively the stored image or an email attached by the stored image.

14 Claims, 13 Drawing Sheets

(56) References Cited

U.S. PATENT DOCUMENTS

| | | | |
|---|---|---|---|
| 2003/0071902 A1* | 4/2003 | Allen et al. | 348/211.11 |
| 2003/0200266 A1* | 10/2003 | Henry | 709/206 |
| 2004/0165546 A1* | 8/2004 | Roskind et al. | 370/318 |
| 2006/0070108 A1* | 3/2006 | Renkis | 725/105 |
| 2007/0299918 A1* | 12/2007 | Roberts | 709/206 |
| 2008/0309759 A1* | 12/2008 | Wilson et al. | 348/143 |
| 2010/0011435 A1* | 1/2010 | Wee et al. | 726/15 |
| 2010/0141762 A1* | 6/2010 | Siann et al. | 348/143 |
| 2010/0328461 A1* | 12/2010 | Renkis | 348/143 |

FOREIGN PATENT DOCUMENTS

| | | |
|---|---|---|
| JP | 2004-234103 A | 8/2004 |
| JP | 2006-175215 A | 7/2006 |
| JP | 2011-175584 A | 9/2011 |
| KR | 10-2002-0008416 A | 1/2002 |
| KR | 10-2003-0084441 A | 11/2003 |
| KR | 10-2006-0030078 A | 4/2006 |
| KR | 10-2009-0078982 A | 7/2009 |
| KR | 10-2010-0005960 A | 1/2010 |
| KR | 10-2010-0013469 A | 2/2010 |

* cited by examiner

REMOTE MANAGEMENT SYSTEM, REMOTE MANAGEMENT METHOD, AND MONITORING SERVER

CROSS-REFERENCE TO RELATED PATENT APPLICATION

This application claims priority from Korean Patent Applications No. 10-2010-0100754, filed on Oct. 15, 2010, and No. 10-2011-0103890, filed on Oct. 12, 2011, in the Korean Intellectual Property Office, the disclosures of which are incorporated herein in their entirety by reference.

BACKGROUND

1. Field

Apparatuses and methods consistent with exemplary embodiments relate to a remote management system, a remote management method, and a monitoring server.

2. Description of the Related Art

Currently, a large number of cameras are installed inside or outside buildings or in the streets with a variety of purposes such as crime prevention, security, and store management. A plurality of cameras may be connected to a monitoring server via a network by wire or wirelessly, and the monitoring server may simultaneously control the connected cameras.

Also, a manager for managing a place where cameras are installed may access the monitoring server by using, for example, a personal computer, and may manage a remote place such as a building or a store.

SUMMARY

Exemplary embodiments provide a remote management system, a remote management method, and a monitoring server for remotely efficiently managing a plurality of remote places.

According to an aspect of an exemplary embodiment, there is provided a remote management system including at least one camera which captures at least one of a moving image and a still image of a remote place; a storage unit which stores the captured image; a control unit which controls operation of the at least one camera; and a communication unit which transmits to a device selectively the stored image or an email attached by the stored image.

The control unit transmits the stored image to the device by using the email if the communication unit is blocked to be accessed from the device by a fire wall.

The communication unit may transmit the email to the device at a predetermined time.

The at least one camera may capture the still image at a predetermined time.

The control unit may delete the transmitted image from the storage unit if the communication unit successfully transmits the stored image or the email attached by the stored image.

The still image may include a panorama image.

The at least one of the moving image and the still image may be an image currently captured by the at least one camera to the device in real time.

The remote management system may further include a counter unit which generates counting data by counting a number of people who appear in a monitoring region on the captured image.

The communication unit may transmit the counting data to the device.

The control unit may select a method for transmitting the image stored in the storage unit to the device according to a size of the stored image.

According to an aspect of another exemplary embodiment, there is provided a remote management method including: capturing at least one of a moving image and a still image of a remote place; storing the captured image; and transmitting to a device selectively the stored image or an email attached by the stored image.

The remote management method may further include determining whether an access from the device is blocked, wherein, if it is determined that the access is blocked, the email attached by the stored image is transmitted to the device, and, if it is determined that the access is not blocked, the stored image is directly transmitted to the device.

The still image may be captured at a predetermined time.

The remote management method may further include deleting the transmitted image if the stored image or the email attached by the stored image is successfully transmitted to the device.

The remote management method may further include generating counting data by counting a number of people who appear in a monitoring region on the captured image, and the counting data may be transmitted to the device.

According to an aspect of another exemplary embodiment, there is provided a monitoring device including: a mail reception unit which receives an email, attached by data, transmitted from a terminal of a remote place; a communication unit which directly receives the data from the terminal, if the data is directly received without being attached to the email; a storage unit which stores the data; and a server which provides a management page for managing the remote place to a client, and transmits the data to the client according to a control signal received from the client, wherein the data is received from the terminal by being attached to the email if the monitoring device is blocked to access the terminal.

The data may include at least one of a still image, a moving image, and counting data generated by counting a number of people who appear in a monitoring region.

The data may include a still image, a moving image, and counting data generated by counting a number of people who appear in a monitoring region.

The server may transform the counting data into a graph and may transmit the graph to the client.

The server may provide a scheduler for selecting a time period to the client, and may transmit to the client an image in the time period selected by using the scheduler from among the stored images.

As such, a plurality of remote places may be efficiently managed.

BRIEF DESCRIPTION OF THE DRAWINGS

The above and other aspects of will become more apparent by describing in detail exemplary embodiments thereof with reference to the attached drawings, in which.

DETAILED DESCRIPTION OF EXEMPLARY EMBODIMENTS

Figure 1:
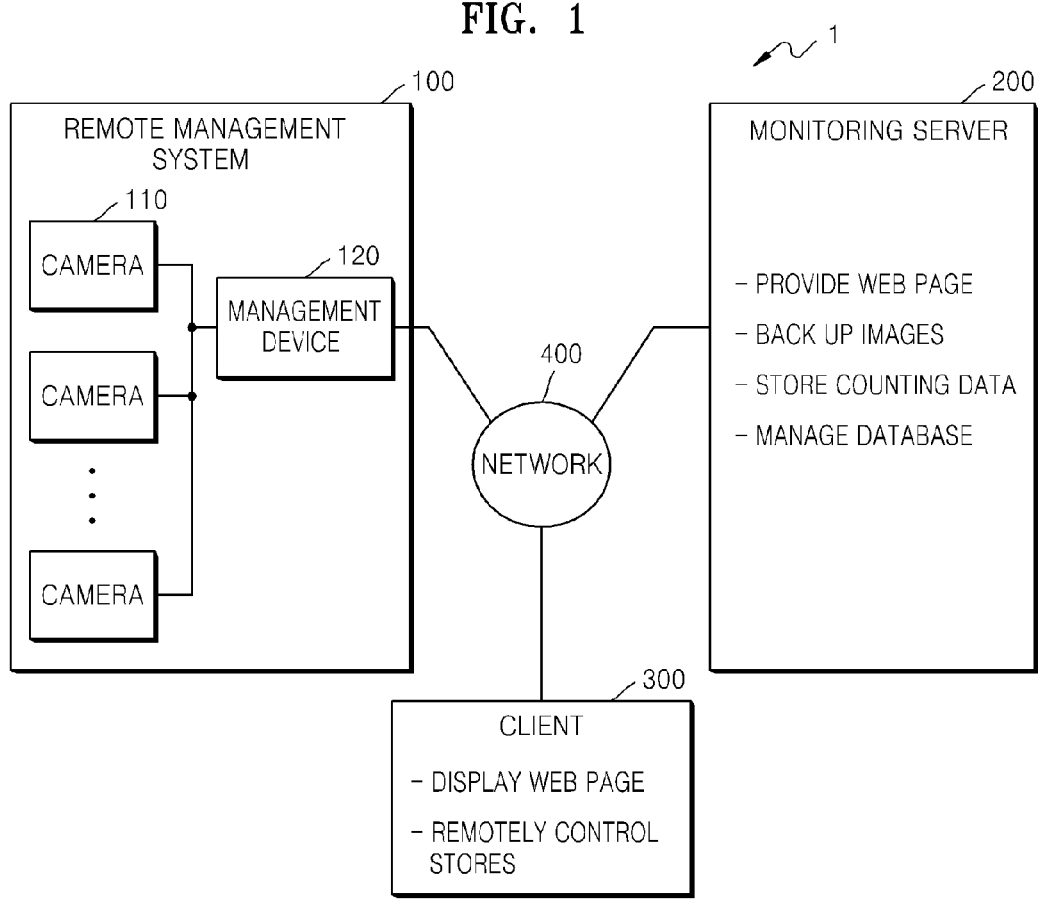
FIG. 1 is a block diagram of a monitoring system according to an exemplary embodiment.

While exemplary embodiments of the inventive concept are susceptible to various modifications and alternative forms, specific exemplary embodiments thereof are shown by way of example in the drawings and will herein be described in detail. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the inventive concept. In the following description, a detailed description of known functions and configurations incorporated herein will be omitted when it may make the inventive concept unclear.

As used herein, the term "and/or" includes any and all combinations of one or more of the associated listed items. Expressions such as "at least one of," when preceding a list of elements, modify the entire list of elements and do not modify the individual elements of the list.

Hereinafter, the inventive concept will be described in detail by explaining exemplary embodiments with reference to the attached drawings. Like reference numerals in the drawings denote like elements and thus repeated descriptions will be omitted.

FIG. 1 is a block diagram of a monitoring system according to an exemplary embodiment.

Referring to FIG. 1, the monitoring system includes a remote management system 100, a monitoring server 200, a client 300, and a network 400.

When a plurality of the remote management system 100 are installed in a plurality of places such as stores where products are displayed and sold, the monitoring system is used to remotely manage a plurality of stores via the monitoring server 200 if a manager of the stores may not directly manage the stores. Each store includes the remote management system 100.

A store is a target to be managed by the client 300. Although a store is described as a target to be managed by the monitoring system of FIG. 1 in the current exemplary embodiment, the target to be managed by the client 300 is not limited to a store. For example, if each floor of a building is monitored for security, each floor may be a target for management by the monitoring system of FIG. 1. That is, the store refers to a remote place physically separate from the monitoring server 200 and the client 300. One or more stores may be monitored.

The store includes the remote management system 100 including a plurality of cameras 110, and a management device 120.

The cameras 110 photograph the store according to their installation locations. The camera 110 may photograph a photographing region all the time or only at a preset time. The camera 110 may be a network camera and may transmit a captured image via the network 400 to an external device, e.g., the management device 120, the monitoring server 200, or the client 300. Also, the camera 110 may be accessed by the external device via the network 400. If the camera 110 is a pan tilt zoom (PTZ) camera having functions such as zoom and rotation, zoom and rotation operations of the camera 110 may be controlled according to a control signal from the monitoring server 200 or the client 300, and thus a photographing region may be changed. Also, if the camera 110 is a PTZ camera, the camera 110 may capture images by varying photographing regions and the captured images may be combined to form a panorama image. In addition, a focus position and an aperture ratio of the camera 110 may also be changed according to a control signal from the monitoring server 200 or the client 300.

Meanwhile, at least some of the cameras 110 may have a counting function for counting the number of people. The number of people may be counted by using various algorithms. For example, a line may be set on a part of an image captured by the camera 110, and the number of people who pass the set line may be counted. Alternatively, a part of or the whole image captured by the camera 110 may be set as a monitoring region, and the number of times that people appear in the set monitoring region may be counted. However, the method of counting the number of people is not limited thereto. The camera 110 having a counting function generates counting data by counting the number of people who appears in the monitoring region, and transmits the generated counting data to the management device 120. The monitoring region may be previously set, and an already set monitoring region may be changed or added according to a control signal from the monitoring server 200 or the client 300.

Figure 2:
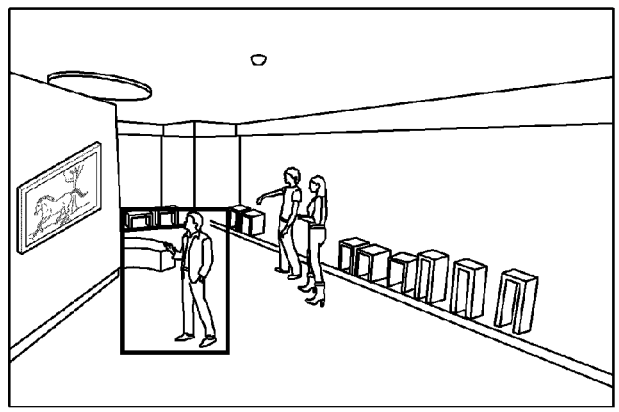
FIG. 2 shows an image captured by a camera illustrated in FIG. 1, according to an embodiment.

FIG. 2 shows an image captured by the camera 110 illustrated in FIG. 1, according to an exemplary embodiment. Referring to FIG. 2, a rectangular region in the store is a monitoring region. If a person exists in the rectangular region, it is determined that there is a customer who looks at a television displayed on a wall. The camera 110 continuously counts the number of people while capturing the image, and generates counting data as a result of the counting.

Referring back to FIG. 1, the management device 120 controls operation of each of the cameras 110 according to a control signal from the monitoring server 200 or the client 300. Also, the management device 120 receives and stores images captured by the cameras 110. The management device 120 may have a storage capacity according to the number of cameras 110 installed in the store, the number of pixels and/or a frame rate of the images captured by the cameras 110, a period for storing the captured images, etc. On the other hand, the number of cameras 110 to be installed, the number of pixels and/or a frame rate of the images captured by the cameras 110, a period for storing the captured images, etc. may be determined according to the storage capacity of the management device 120.

The management device 120 may be a personal computer. The management device 120 may check a plurality of images captured by the cameras 110 in real time to monitor the store, and thus, may include a display device. In this case, the management device 120 may simultaneously display the captured images. Also, images stored in the management device 120 may be displayed on the display device.

The cameras 110 and the management device 120 are connected via the network 400 to the monitoring server 200 and/or the client 300.

Figure 3:
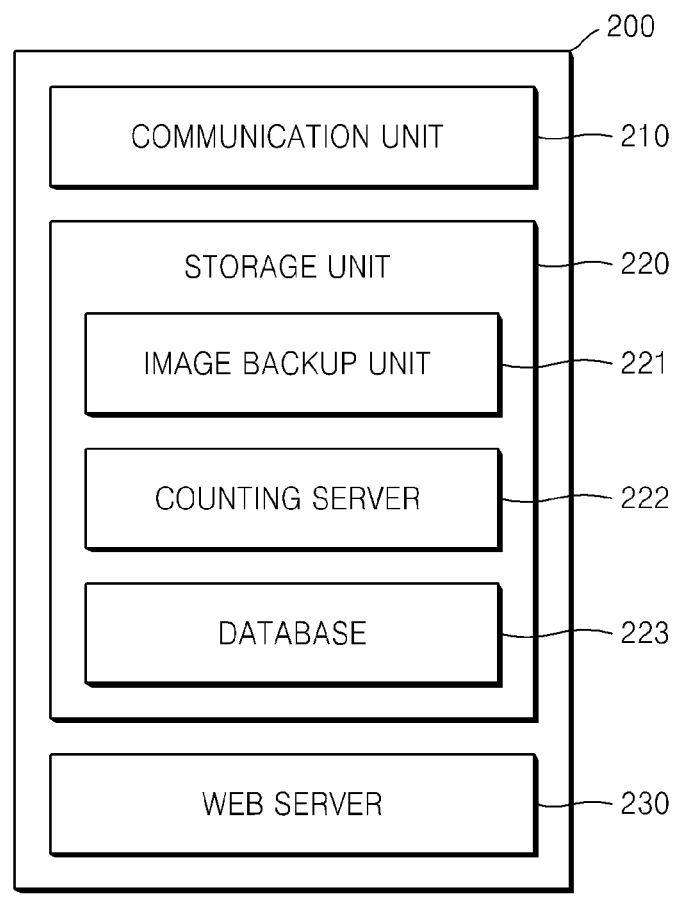
FIG. 3 is a block diagram of a monitoring server illustrated in FIG. 1, according to an exemplary embodiment.

FIG. 3 is a block diagram of the monitoring server 200 illustrated in FIG. 1, according to an exemplary embodiment. Referring to FIG. 3, the monitoring server 200 backs up images captured by the remote management system 100 of a plurality of stores, and stores counting data generated by the remote management system 100. Also, the monitoring server 200 manages a database for storing various types of data regarding the stores. Furthermore, the monitoring server 200 provides a web page to the client 300, and allows the client 300 to manage the stores on the web page. The monitoring server 200 includes a communication unit 210, a storage unit 220, and a web server 230.

The communication unit 210 transmits and receives data or various signals to and from a plurality of cameras 110 installed in the remote management system 100 included in a plurality of stores, the management device 120, and the client 300, via the network 400. The communication unit 210 receives captured images of the stores and counting data regarding monitoring regions, from the remote management system 100.

The storage unit 220 may store images captured by and counting data generated by the cameras 110 of the remote management system 100, and various types of information regarding the cameras 110 installed in the stores. The storage unit 220 includes an image backup unit 221, a counting server 222, and a database 223.

The image backup unit 221 stores the images captured by the cameras 110. The image backup unit 221 may receive and store images currently captured by the cameras 110 in real time. Also, the image backup unit 221 may receive and store images stored in the management device 120. The image backup unit 221 may store all images captured by the cameras 110, or may selectively store images captured only at a certain time. The image backup unit 221 may permanently store the captured images. However, since a storage capacity of a storage medium is limited, the stored images may be automatically deleted after a certain time or period. Meanwhile, when the captured images are received from the remote management system 100 and are stored in the image backup unit 221, the monitoring server 200 may control the communication unit 210 to receive the captured image at a preset time, e.g., closing times of the stores.

The counting server 222 stores the counting data received from cameras having a counting function, from among the cameras 110 installed in the stores. If the client 300 requests to transmit the counting data, the counting server 222 transforms the counting data into a graph and transmits the graph to the client 300. However, the method of transmitting the counting data is not limited thereto. The counting server 222 may transmit the counting data itself to the client 300, and the client 300 may generate a graph by using the received counting data.

The database 223 stores information regarding the stores managed by the client 300, and information regarding the cameras 110 installed in the stores. For example, as the information regarding the stores, the database 223 may store information regarding a manager, an address, a phone number, a fax number, selling products, or a map such as a floor plan or a product display map of each of the stores. Also, as the information regarding the cameras 110, the database 223 may store a model name or specifications regarding photographing performances, e.g., a zoom function and a viewing angle, of each of the cameras 110.

The web server 230 provides a web page for store management so as to allow the client 300 to manage the stores on the web page. Also, the web server 230 transmits to the client 300 the images stored in the image backup unit 221 or the counting data stored in the counting server 222, according to a control signal received from the client 300. The web server 230 provides a program such as Active X or Silverlight to the client 300 who accesses the web server 230, so as to allow the client 300 to execute various functions provided on the web page. Alternatively, the web server 230 may directly execute a servlet, and may provide a result of the execution to the client 300. That is, the web server 230 supports the client 300 to execute various functions on various platforms.

Meanwhile, the web server 230 may provide a scheduler to allow the client 300 to easily search the stored images. For example, the scheduler may be displayed in the form of a calendar or a table, and may allow reproduction of images stored on a selected date or at a selected time. The scheduler may be updated whenever newly captured images are stored in the image backup unit 221, or the images stored in the image backup unit 221 are deleted.

The client 300 accesses the monitoring server 200 and manages the stores on the web page provided by the web server 230. A plurality of clients 300 may exist, and the clients 300 may simultaneously access the monitoring server 200.

The client 300 executes the program such as Active X or Silverlight provided by the web server 230, and executes various functions provided by on the web page. Alternatively, the client 300 receives a result of executing various functions, which is transmitted by the web server 230. The client 300 may receive and display the images stored in the image backup unit 221 or the management device 120, or live images currently captured by the cameras 110. Also, the client 300 may receive and display the counting data stored in the counting server 222, or the graph generated by using the counting data. Furthermore, the client 300 may add to the database 223 new stores and cameras 110 installed in the new stores, through the web page.

The network 400 refers to a means for transmitting and receiving captured images, various types of data, control signals, etc. The network 400 may refer to any means for transmitting and receiving data by wire or wirelessly. For example, the network 400 may connect the cameras 110, the management device 120, the monitoring server 200, and the client 300 by wire, e.g., via cables, or wirelessly, e.g., via a wireless local area network (WLAN).

A method of monitoring a plurality of stores by the monitoring server 200 and the client 300 will now be described with reference to FIGS. 4 through 12.

Figure 4:
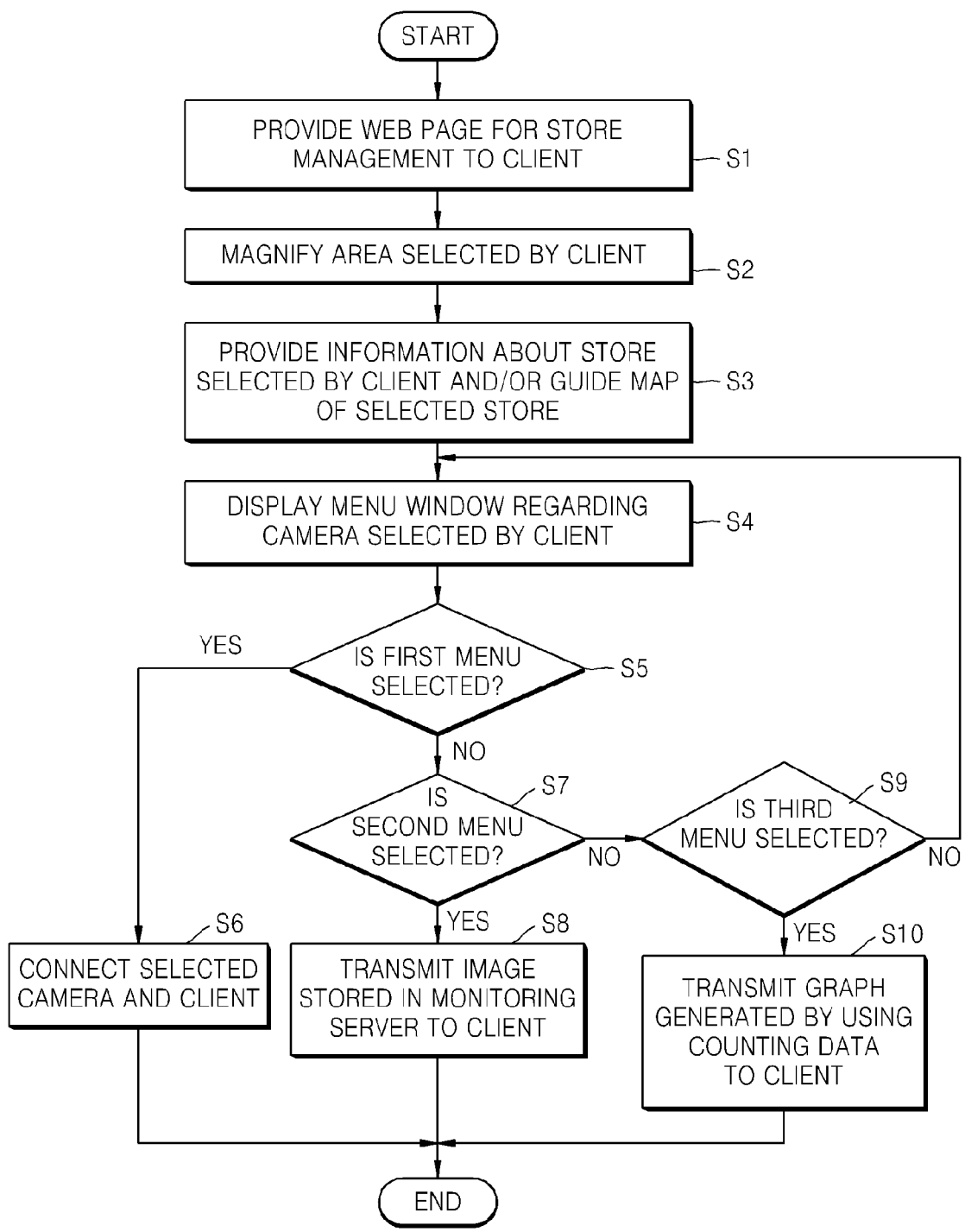
FIG. 4 is a flowchart of a method of controlling a monitoring server illustrated in FIG. 1, according to an exemplary embodiment.

FIG. 4 is a flowchart of a method of controlling the monitoring server 200 illustrated in FIG. 1, according to an exemplary embodiment. FIGS. 5 through 12 are screen images for describing a method of monitoring the stores by the client 300 illustrated in FIG. 1, according to an exemplary embodiment.

Referring to FIG. 4, if the client 300 access the monitoring server 200, the web server 230 provides a web page for store management to the client 300 (operation S1). In this case, the client 300 inputs an identification (ID) and a password to access the monitoring server 200.

Figure 5:
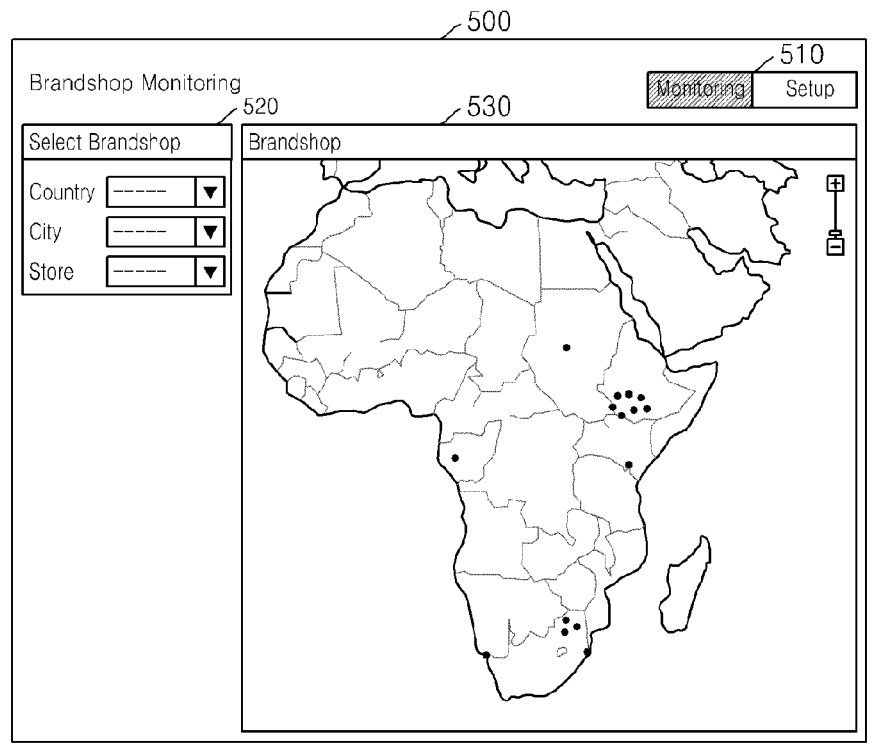
FIGS. 5 through 12 are screen images for describing a method of monitoring stores by a client illustrated in FIG. 1, according to an exemplary embodiment.

Referring to FIG. 5, a screen of a web page 500 for store management, which is provided to the client 300 who inputs the ID and the password and is authorized to access the monitoring server 200, is illustrated. A function selection button 510 for selecting one of 'Monitoring' and 'Setup' functions may be displayed on the screen of the web page 500. Also, a store selection window 520 for selecting a store to be monitored, and a main window 530 for displaying locations of the stores may be displayed on the screen of the web page 500.

If a control signal for selecting a certain area is applied by the client 300, the web server 230 provides a magnified map of the selected area to the client 300 (operation S2).

Figure 6:
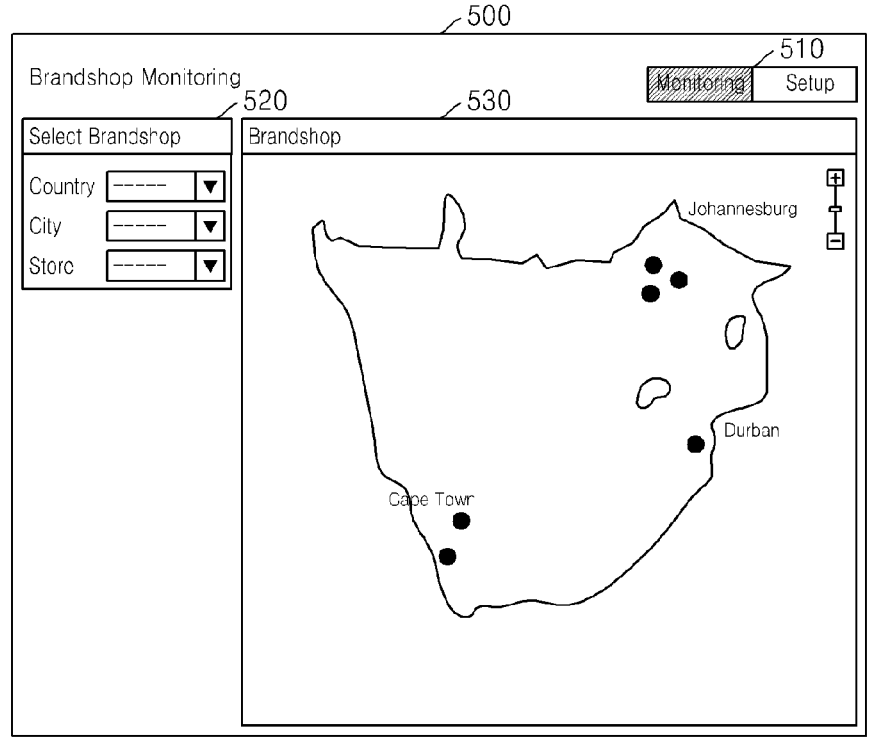

Referring to FIG. 6, a screen in which the area selected by the client 300 is magnified is illustrated. The selected area is a bottom area in the map displayed on the main window 530 of FIG. 5. The stores located in the magnified area are displayed on the map. Although the client 300 selects a certain area on the map displayed on the main window 530 in the above description, the current exemplary embodiment is not limited thereto. For example, a certain store may be selected by sequentially selecting a country selection menu, a city selection menu, and a store selection menu of the store selection window 520.

Meanwhile, if a certain store is selected from among a plurality of stores by the client 300, information regarding the store selected on the main window 530 and/or a guide map of the selected store is provided to the client 300, and the client 300 displays the provided information or map (operation S3).

Figure 7:
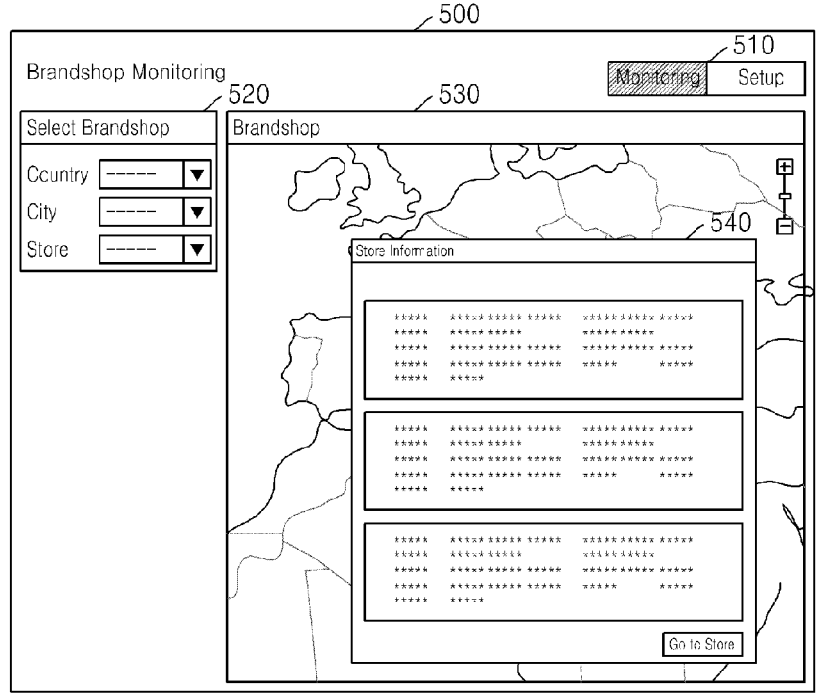

Referring to FIG. 7, a screen in which the information regarding the store selected by the client 300 is displayed on a store information window 540 is illustrated. Here, if a 'Go to Store' button at a bottom portion of the store information window 540 is clicked, the screen may be switched to a screen for managing the selected store.

Figure 8:
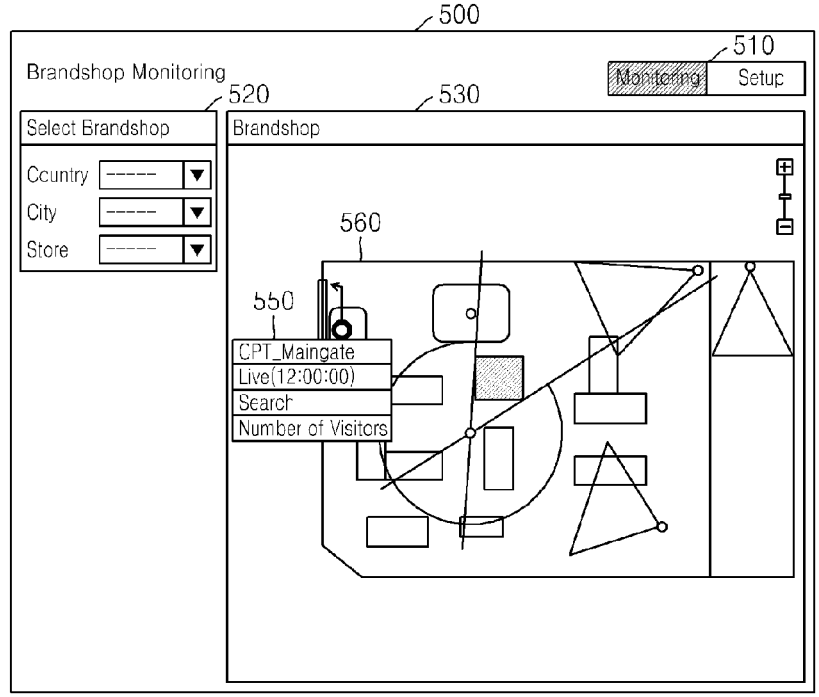

Referring to FIG. 8, a screen in which a guide map 560 of a certain store is displayed on the main window 530 when the store is selected by the client 300, or the screen is switched from the store information window 540 is illustrated. The guide map 560 may display locations of a plurality of cameras 110 installed in the store. In addition, the guide map 560 may also display, for example, photographing ranges and photographing directions of the installed cameras 110.

If the guide map 560 displays the locations of the cameras 110, the client 300 may select a certain camera 110 displayed on the guide map 560. If a certain camera 110 is selected, a menu window 550 for displaying functions executable by the selected camera 110 is displayed (operation S4).

Referring to FIG. 8, a screen in which, when a camera 110 for photographing a main gate is selected by the client 300, the menu window 550 regarding the camera 110 is displayed is illustrated. In FIG. 8, as the executable functions, 'Live', 'Search', and 'Number of Visitors' are displayed. However, the executable functions are not limited thereto, and various functions executable by the camera 110 may be included in the menu window 550.

The web server 230 determines which of the displayed functions is selected by the client 300 while the menu window 550 is being displayed (operations S5, S7, and S9).

If the client 300 selects the 'Live' function for viewing a live image, the web server 230 connect the selected camera 110 and the client 300 (operation S6). If the camera 110 and the client 300 are connected, a currently captured image is streamed in real time from the camera 110 to the client 300. In this case, a network address of the camera 110 may be linked to a portion of the menu window 550 for displaying the 'Live' function.

Figure 9:
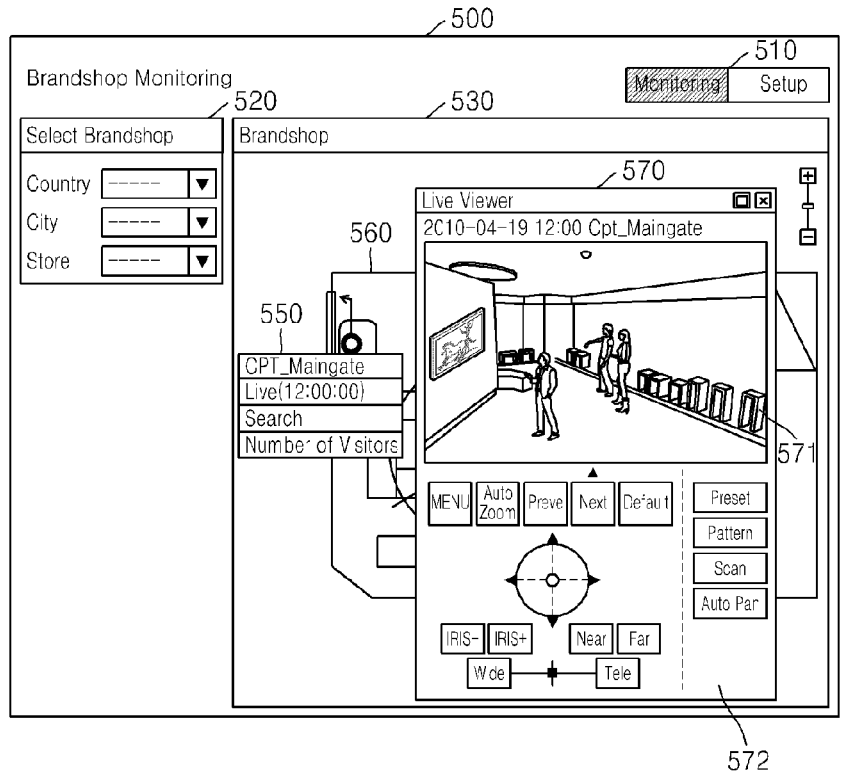

Referring to FIG. 9, a screen in which, when the client 300 selects the 'Live' function, a live menu window 570 for viewing a live image captured by the camera 110 is displayed is illustrated. The live menu window 570 includes an image window 571 for displaying a currently captured image. Also, if the selected camera 110 is a PTZ camera, the live menu window 570 may include a camera control window 572 for controlling, for example, a direction and a zoom ratio of the camera 110.

The camera control window 572 may display various function buttons for controlling the camera 110. In FIG. 9, as the function buttons, 'Menu', 'Auto Zoom', 'Preve', 'Next', 'Default', 'Preset', 'Pattern', 'Scan', 'Auto Pan', 'IRIS-', IRIS+', 'Near, Far', and 'Wide, Tele' are displayed. Also, a PTZ control button for controlling the direction of the camera 110 is displayed. However, the function buttons are not limited thereto. Descriptions of the function buttons will not be provided here and a PTZ control method of the camera 110 will now be described.

If the camera 110 installed in the store is a PTZ camera, the client 300 may control pan, tilt, and zoom operations of the camera 110. In this case, the zoom operation may be controlled by using the 'Auto Zoom' button or the 'Wide, Tele' button. The control of the pan and tilt operations will be described as follows.

For example, if the client 300 clicks a certain position of the PTZ control button displayed as a circle, the camera 110 may move from a current position toward the position clicked by the client 300. In this case, a moving speed of the camera 110 may be controlled according to a distance from the center of the PTZ control button to the clicked position.

Figure 10:
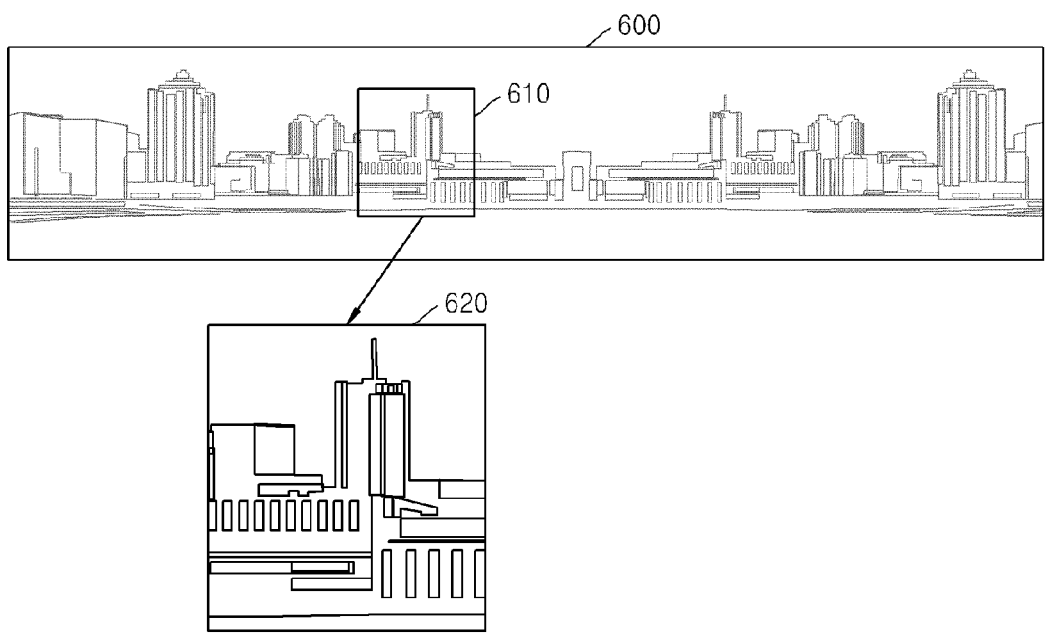

As another example, the camera 110 may move to a position selected by the client 300 on a panorama image. In this case, the camera 110 is 360°-rotatable. Referring to FIG. 10, the camera 110 captures a panorama image 600 by the control of the client 300 or at a preset time. The client 300 clicks or drags a region 610 on the panorama image 600. The camera 110 moves to a position for photographing the clicked or dragged region 610.

As still another example, the client 300 may previously set a path for moving the camera 110 such that the camera 110 moves according to the set path. In this case, the client 300 may set the path in such a way that the camera 110 sequentially moves to a plurality of positions. Also, the path is not limited to only one, and one of a plurality of paths may be selected.

The method of moving the camera 110 is not limited thereto, and may be variously changed or added.

Meanwhile, if the client 300 selects the 'Search' function for reproducing a stored image, the web server 230 streams an image stored in the image backup unit 221 to the client 300 (operation S8).

Figure 11:
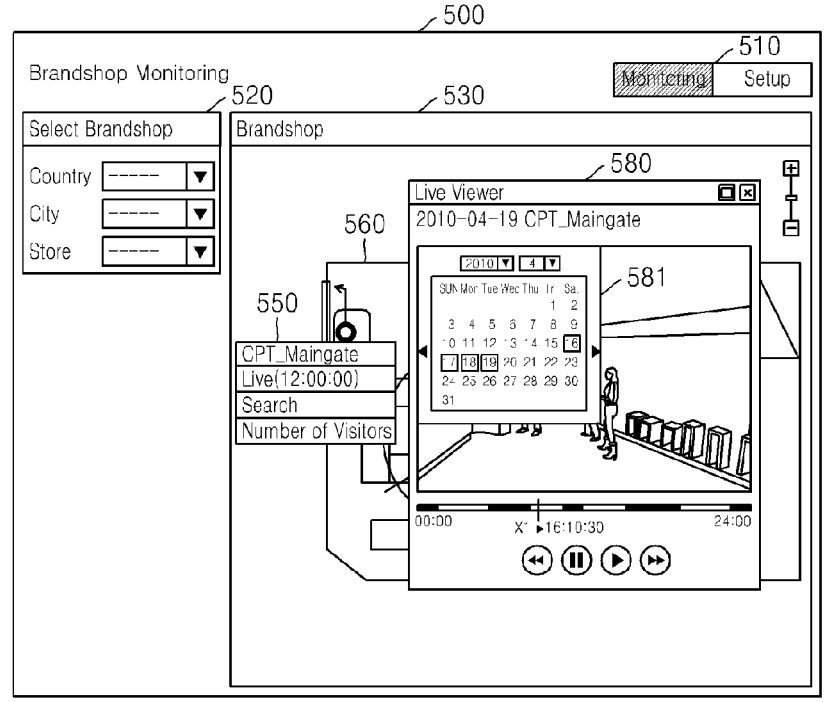

Referring to FIG. 11, a reproduction menu window 580 for reproducing an image stored in the image backup unit 221 when the client 300 selects the 'Search' function is illustrated. The reproduction menu window 580 may include function buttons for controlling a current temporal position of the reproduced captured image.

Also, the web server 230 may provide a scheduler 581 to the client 300 so as to allow the client 300 to search for an image captured at a desired time from among the images stored in the image backup unit 221. The client 300 may easily reproduce a desired image by searching for a desired date on the scheduler 581, and reproducing one of images captured on the searched date.

Meanwhile, if the client 300 selects the 'Number of Visitors' function, the web server 230 transmits the counting data stored in the counting server 222 to the client 300 (operation S10).

Figure 12:
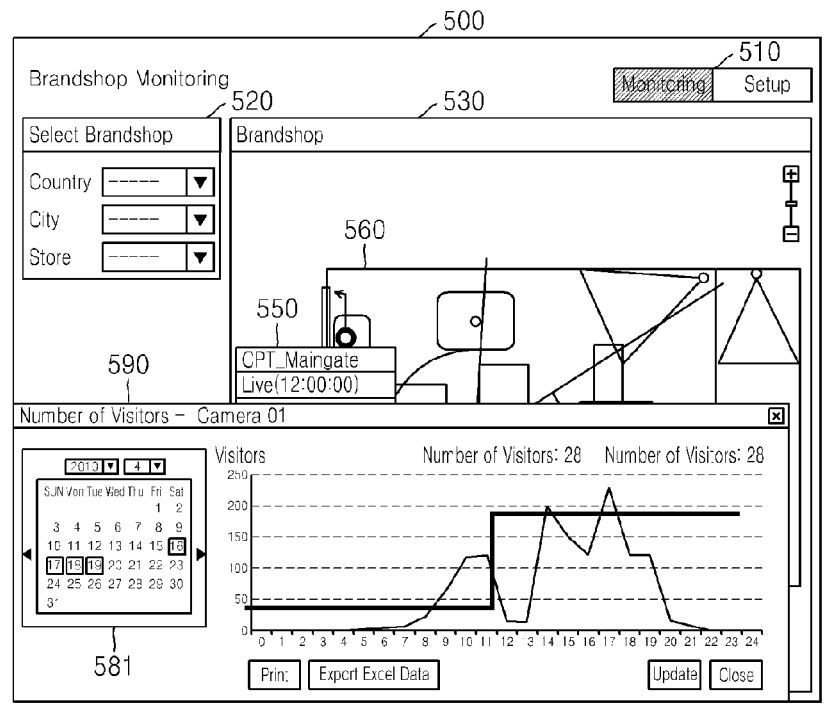

Referring to FIG. 12, a statistic window 590 for displaying a graph generated by the counting data is illustrated. The statistic window 590 may display various graph lines generated by using the counting data. For example, a graph line showing the number of people counted based on time zones, and a graph line showing the number of people counted based on cameras may be displayed. Also, the web server 230 may provide the scheduler 581 so as to allow the client 300 to receive the counting data of a certain date.

Also, although not shown in FIGS. 5 through 12, if the 'Setup' function is selected by using the function selection button 510, the client 300 may add a new store. If the new store is added, store information and information regarding the cameras 110 installed in the new store may also be added. Also, if information regarding the registered stores is changed, the client 300 may update the information stored in the database 223.

Meanwhile, if a plurality of clients 300 exist, the clients 300 may be grouped into different layers and the clients 300 who belong to different layers may have different authorizations in the monitoring server 200. For example, a client 300 who has an administrator ID for managing the monitoring server 200 itself may manage other clients 300 or may add a new client 300, and may manage all stores and all cameras 110. On the other hand, a client 300 who belongs to a low layer may be authorized to manage only a certain store and a certain camera 110.

However, the functions executable by using the 'Setup' function are not limited thereto.

As such, in the monitoring system of FIG. 1, the client 300 may remotely efficiently manage a plurality of stores via the monitoring server 200 and a plurality of cameras 110 included in the remote management system 100 included in each of the stores.

A program for executing the above monitoring method in the monitoring server 200 can be stored in a recording medium, e.g., the storage unit 220.

A monitoring system according to another exemplary embodiment will now be described.

Figure 13:
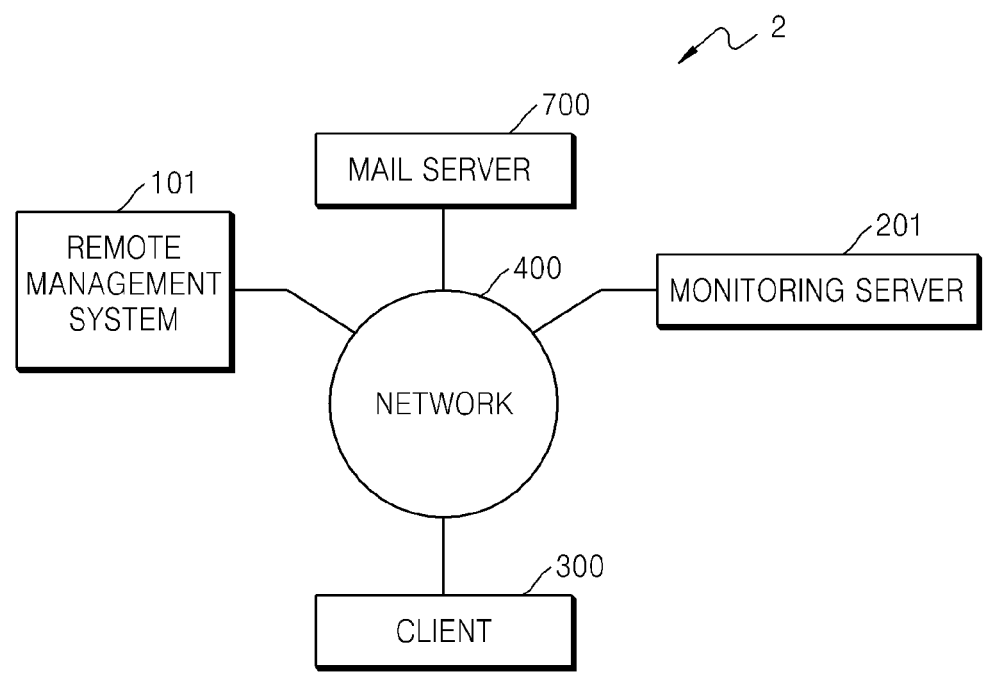
FIG. 13 is a block diagram of a monitoring system according to another exemplary embodiment.

FIG. 13 is a block diagram of a monitoring system 2 according to another exemplary embodiment.

Referring to FIG. 13, the monitoring system 2 includes a remote management system 101 included in each store, a monitoring server 201, a client 300, a network 400, and a mail server 700. In the current exemplary embodiment, when an image or counting data is transmitted from the remote management system 101 of the store to the monitoring server 201, an email function is added. Hereinafter, differences from the monitoring system 1 illustrated in FIG. 1 will be mainly described and repeated descriptions will not be provided.

A store is a target to be managed by the client 300. The store includes the remote management system 101 capable of capturing a moving image, a still image, or a panorama image and of generating counting data by counting the number of people who appear in a monitoring region of the moving image.

The remote management system 101 of the store may transmit the images and the counting data to the monitoring server 201 by using an email or directly via the network 400.

The monitoring server 201 receives and stores the images and the counting data from the remote management system 101 of the store, and provides the stored data to the client 300.

The client 300 accesses the monitoring server 201 and manages a plurality of stores on a web page provided by the web server 230.

The network 400 refers to a means for transmitting and receiving captured images, various types of data, control signals, etc. The network 400 may refer to any means for transmitting and receiving data by wire or wirelessly.

The mail server 700 transmits an email received from the remote management system 101 of the store to the monitoring server 201. If the transmission of the email is successful or fails, the mail server 700 may transmit a transmission success or failure message to the remote management system 101. The mail server 700 may be any existing server for providing an email service.

The remote management system 101 of the store will now be described in detail.

Figure 14:
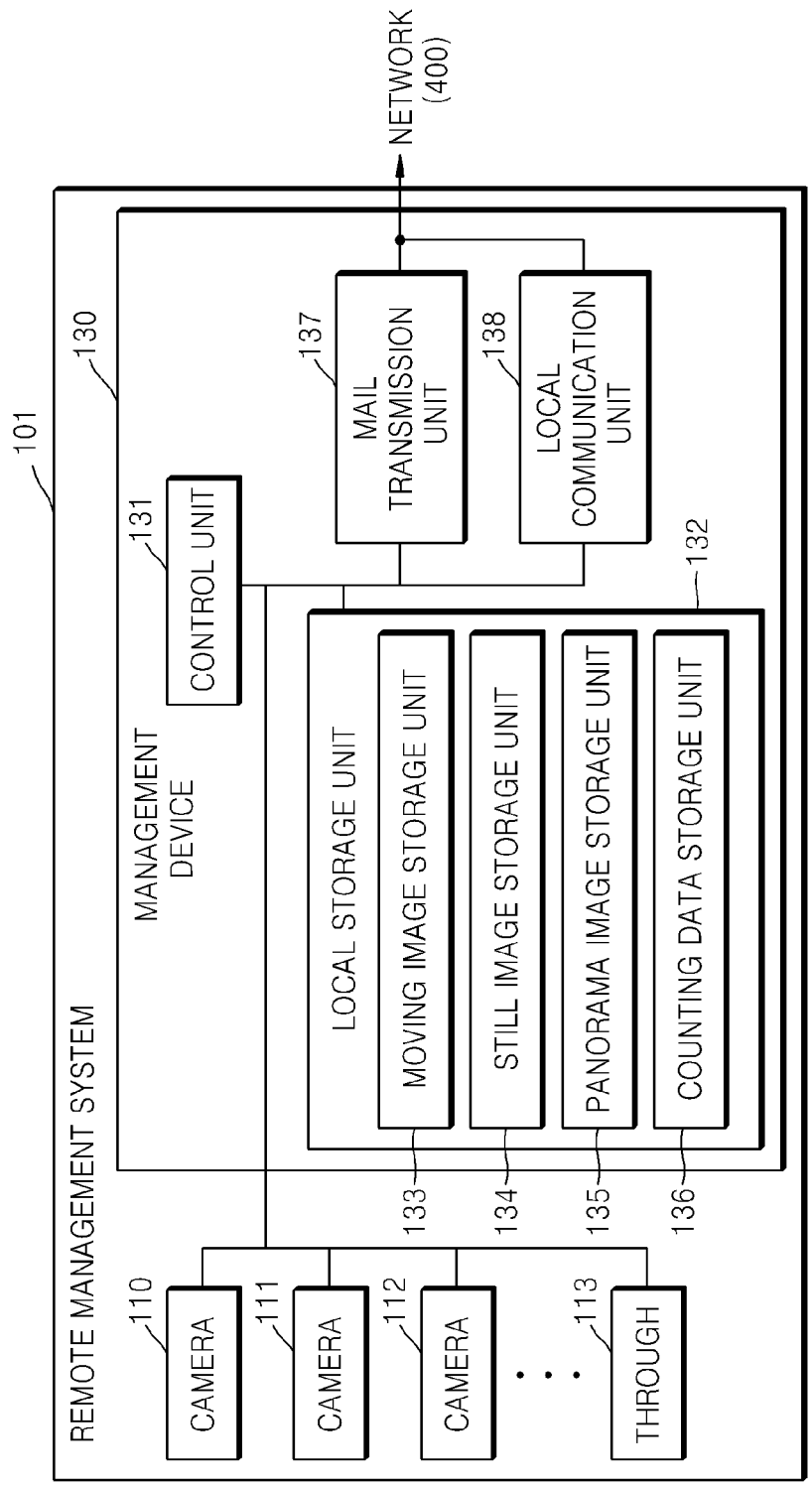
FIG. 14 is a block diagram of a remote management system illustrated in FIG. 13, according to an exemplary embodiment.

FIG. 14 is a block diagram of the remote management system 101 illustrated in FIG. 13, according to an exemplary embodiment.

Referring to FIG. 14, the remote management system 101 includes one or more cameras 110 through 113 for capturing images, and a management device 130 for controlling the cameras 110 through 113.

The cameras 110 through 113 capture images of a remote place according to positions where they are installed. The cameras 110 through 113 may capture at least one of a moving image and a still image, and each of the moving image and the still image may be captured all the time, only at a preset time, or by an indication from the client 300. Alternatively, the cameras 110 through 113 may repeatedly capture an image in a fixed cycle.

At least some of the cameras 110 through 113 may include a counter unit having a counting function for counting the number of people. The counter unit may generate counting data by using the counting function.

If a PTZ camera capable of performing pan, tilt, and zoom operations is included from among the cameras 110 through 113, a panorama image may be captured. The panorama image may be generated by combining a plurality of still images captured by the PTZ camera while rotating 360° in a horizontal direction. The panorama image may be captured in a fixed cycle or by an indication from a store manager or the client 300.

Accordingly, the cameras 110 through 113 transmit to the management device 130 the moving image, the still image, the panorama image, and/or the counting data according to the camera functions.

The management device 130 controls operation of the cameras 110 through 113, and transmits the images or the data to the monitoring server 201. The management device 130 may include a control unit 131, a local storage unit 132, a mail transmission unit 137, and a local communication unit 138.

The control unit 131 controls operation of the cameras 110 through 113 and elements of the management device 130. The control unit 131 determines whether the monitoring server 201 is blocked to access the remote management system 101 by a fire wall, and transmits data to be transmitted to the monitoring server 201 by using an email or directly according to a result of the determination. Alternatively, when the remote management system 101 is installed, the control unit 131 may previously determine whether the monitoring server 201 is blocked to access the remote management system 101 by a fire wall and may previously set a method of transmitting data.

The local storage unit 132 stores various types of data. The local storage unit 132 includes a moving image storage unit 133 for storing moving images, a still image storage unit 134 for storing still images, a panorama image storage unit 135 for storing panorama images, and a counting data storage unit 136 for storing counting data.

The sub-storage units 133 through 136 included in the local storage unit 132 may not necessarily be separate in hardware, and may be one storage medium. In this case, the moving image storage unit 133, the still image storage unit 134, the panorama image storage unit 135, and the counting data storage unit 136 may refer to divided regions on the storage medium, or may be elements corresponding folders in a computer.

The mail transmission unit 137 attaches an image stored in the local storage unit 132 to an email, and transmits the email to the monitoring server 201. The mail transmission unit 137 may be used to transmit a captured image or counting data to the monitoring server 201 when the monitoring server 201 is blocked to access the remote management system 101 by a fire wall. Alternatively, the mail transmission unit 137 may transmit data to be transmitted by using an email if the data has a small size.

The mail transmission unit 137 may transmit a still image, a panorama image, and/or counting data, which has a relatively small size. However, the data transmitted by the mail transmission unit 137 is not limited thereto. If a moving image is in a range of size attachable to an email, the moving image may be attached to an email and may be transmitted to the monitoring server 201.

The mail transmission unit 137 transmits an email, to which an image and/or data is attached, via the network 400, the mail server 700 receives the transmitted email, and the monitoring server 201 extracts and stores a file attached to the email received by the mail server 700.

Meanwhile, the mail transmission unit 137 may automatically transmit the email at a fixed time. In this case, the mail transmission unit 137 may attach to the email an image and/or data stored in a corresponding sub-storage unit at the time when the email is written. The fixed time may be a time when the amount of traffic on the network 400 is small. Alternatively, the fixed time may be a time immediately before the store is closed. That is, the fixed time may be a time fixed according to an intention of the client 300.

The local communication unit 138 transmits an image stored in the local storage unit 132 directly to the monitoring server 201 via the network 400. The local communication unit 138 may transmit a currently captured live image to the monitoring server 201.

The local communication unit 138 may be used to transmit a captured image and/or counting data to the monitoring server 201 when the monitoring server 201 is allowed to access the remote management system 101. Alternatively, the local communication unit 138 may be used when information to be transmitted has a relatively large size.

Meanwhile, if an email is successfully transmitted to the monitoring server 201 by the mail transmission unit 137, the control unit 131 may delete transmitted image and/or data. That is, if an email to which a still image, a panorama image, and/or counting data are attached is successfully transmitted to the monitoring server 201, the control unit 131 may delete a file of the still image transmitted from the still image storage unit 134, may delete a file of the panorama image transmitted from the panorama image storage unit 135, and/or may delete the counting data stored in the counting data storage unit 136.

Although the mail transmission unit 137 using the email and the local communication unit 138 directly transmitting the stored image to the monitoring server 201 are configured to be separated devices as the device for transmitting the stored image to the monitoring server 201, the present exemplary embodiment is not limited thereto. The mail transmission unit 137 and the local communication unit 138 may be integrated in a device having a communication function, and the device may perform both data transmitting methods.

Figure 15:
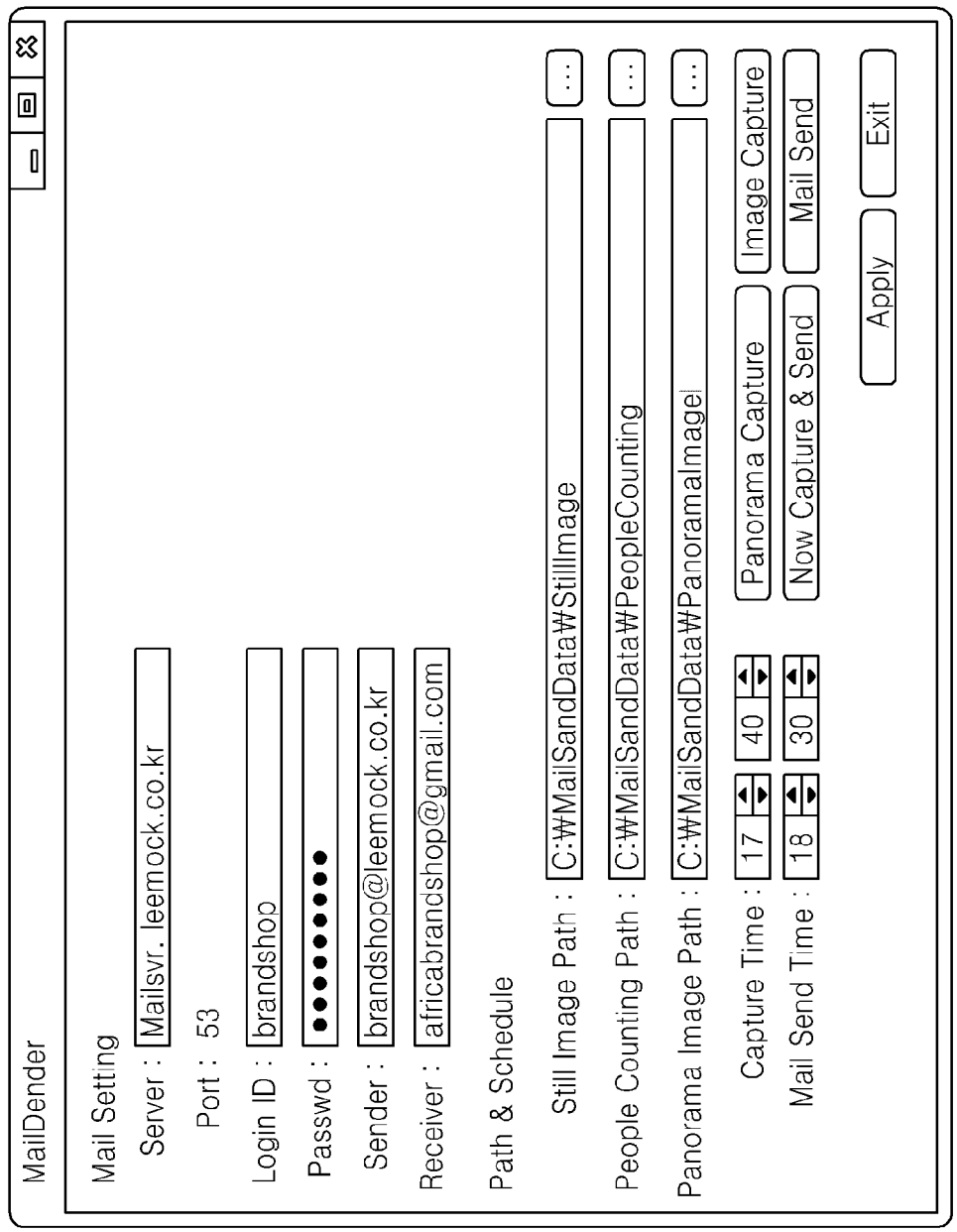
FIG. 15 is an image of a screen for setting a method of transmitting an email in the remote management system illustrated in FIG. 14, according to an exemplary embodiment.

FIG. 15 is an image of a screen for setting a method of transmitting an email in the remote management system 101 illustrated in FIG. 14, according to an exemplary embodiment.

Referring to FIG. 15, in order to automatically or manually transmit an email, the client 300 or a store manager may set a 'Server' address, a 'Port' number, a 'Login ID', a 'Passwd', a 'Sender' address, a 'Receiver' address, etc.

Also, a path of a folder in which data to be attached to the email may be set. In FIG. 15, a 'Still Image Path' is a menu for setting a path of a folder from which still image data is attached, a 'People Counting Path' is a menu for setting a path of a folder from which counting data is attached, and a 'Panorama Image Path' is a menu for setting a path of a folder from which panorama image data is attached.

Furthermore, a 'Capture Time' is a menu for setting a time for capturing a still image and a panorama image by the cameras 110 through 113. If the 'Capture Time' is set, files including data of a still image and a panorama image are generated at the set time and are stored in corresponding folders.

Meanwhile, with respect to counting data, the counter unit continuously generates new data while a moving image is being captured. Accordingly, the counter unit may periodically update the counting data by storing generated counting data in a corresponding folder, and adding newly generated counting data. Alternatively, the counter unit may store counting data to be transmitted in a corresponding folder before a time for transmitting an email.

A 'Mail Send Time' is a menu for setting a time for transmitting an email. When the time is set, an email may be automatically transmitted at the set time. In this case, the email to be transmitted may be transmitted by attaching the still image, the panorama image, and/or the counting data from the previously set paths of folders.

In addition to the above setups for transmitting an email, the client 300 or the store manager may select a 'Panorama Capture' button or an 'Image Capture' button to capture a panorama image or a still image at a desired time, or may select a 'Now Capture & Send' button to transmit an image immediately after the image is captured. Also, a 'Mail Send' button may be selected to immediately send an email by attaching files currently stored in folders.

Figure 16:
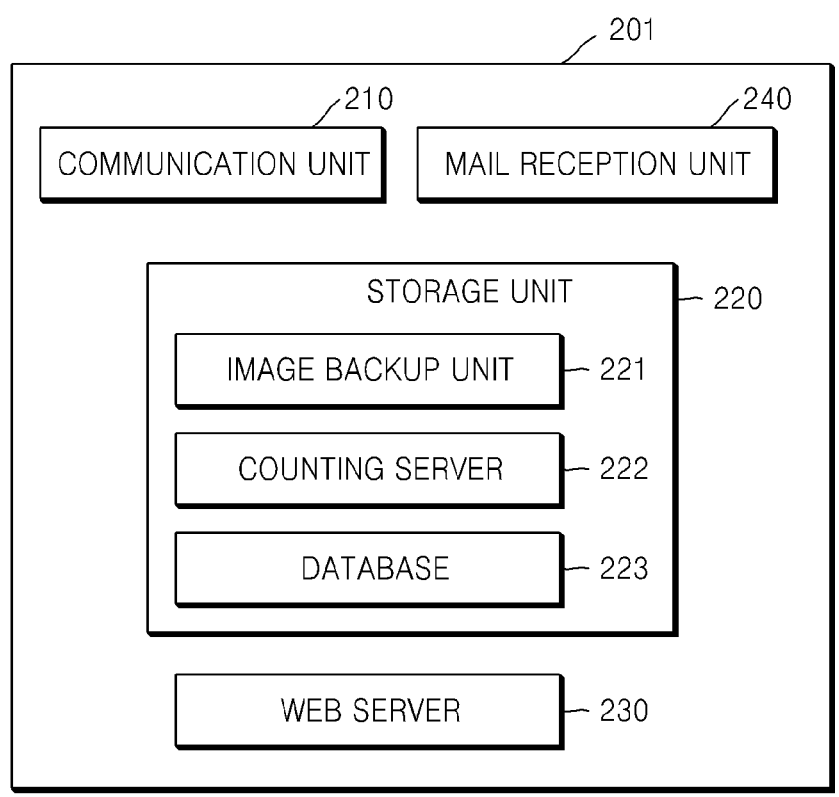
FIG. 16 is a block diagram of a monitoring server illustrated in FIG. 13, according to an exemplary embodiment.

FIG. 16 is a block diagram of the monitoring server 201 illustrated in FIG. 13, according to an exemplary embodiment. In the current exemplary embodiment, a function of receiving data from the remote management system 101 by using an email is added. Hereinafter, differences from the monitoring server 200 illustrated in FIG. 3 will be mainly described and repeated descriptions will not be provided.

Referring to FIG. 16, the monitoring server 201 may further include a mail reception unit 240 in addition to the communication unit 210, the storage unit 220, and the web server 230.

If the remote management system 101 transmits a still image, a panorama image, and/or counting data by using an email, the mail reception unit 240 downloads the still image, the panorama image, and/or the counting data attached to the email from the mail server 700, and stores them in the image backup unit 221 and the counting server 222. If a moving image is transmitted by using an email, the mail reception unit 240 may store the moving image in the image backup unit 221.

Figure 17:
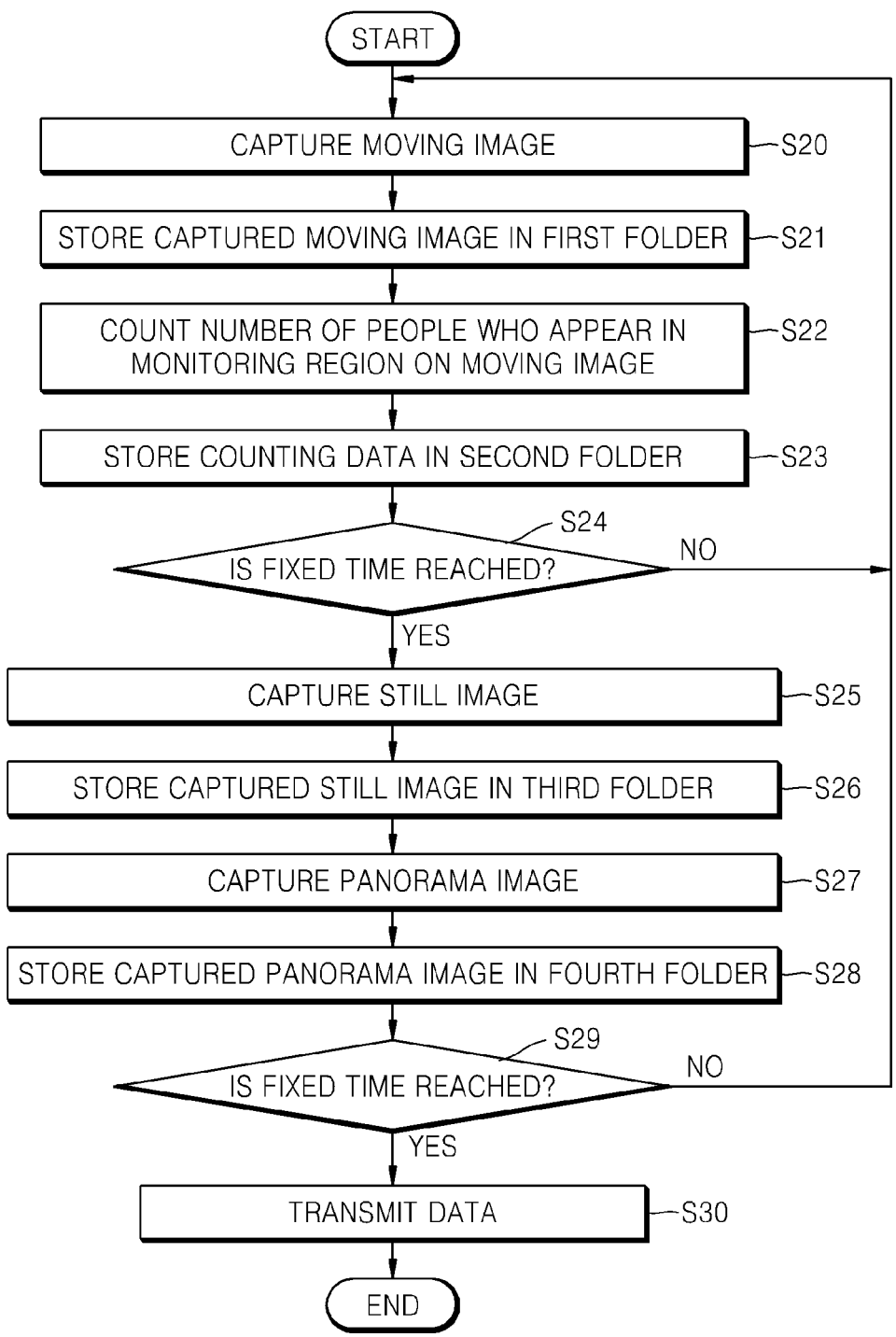
FIGS. 17 and 18 are flowcharts of a remote management method according to an exemplary embodiment.
Figure 18:
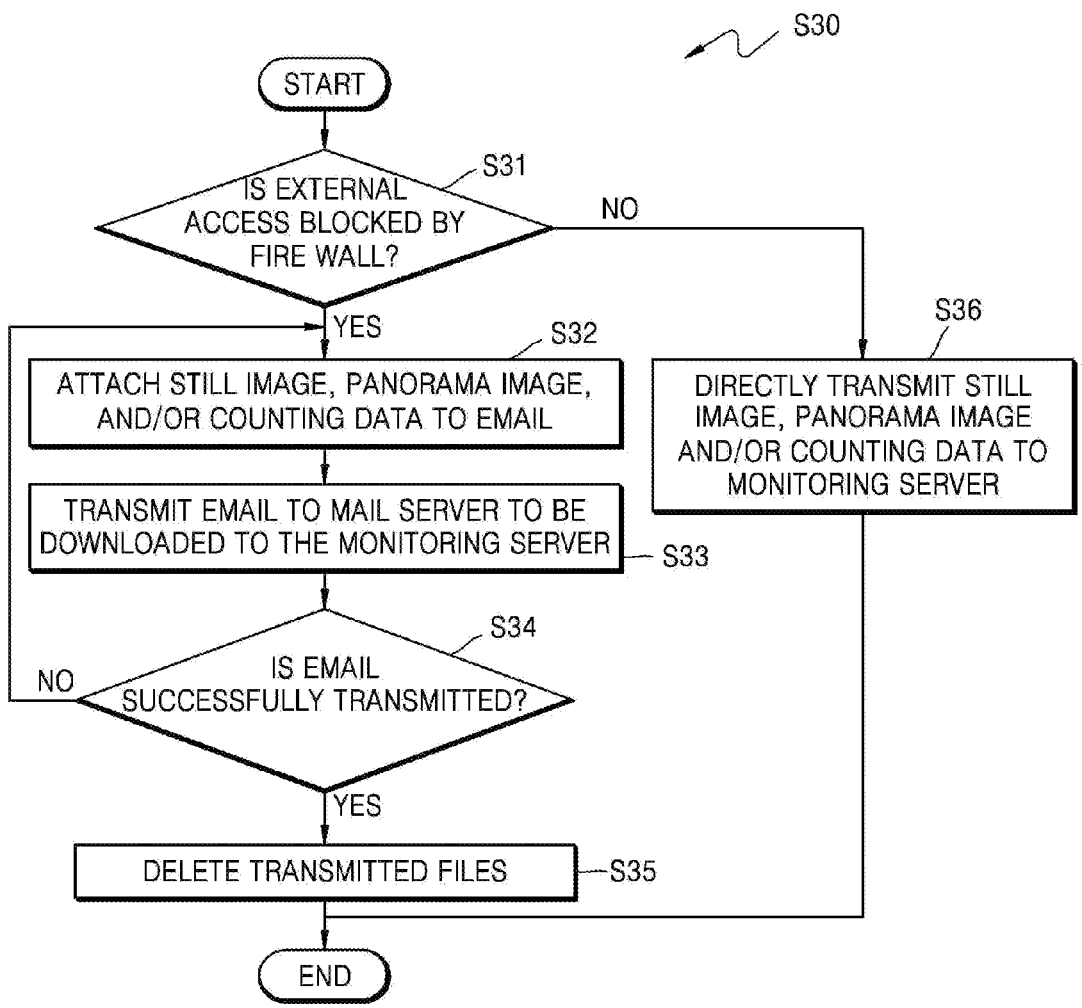

FIGS. 17 and 18 are flowcharts of a remote management method according to an exemplary embodiment.

Referring to FIG. 17, if an indication for starting photographing is given at a set time, e.g., a store open time, a moving image is captured (operation S20). If it is set to capture a moving image for 24 hours, the moving image may be captured without an additional indication. The captured moving image is stored in a first folder for storing moving images (operation S21).

While the moving image is being captured, counting data is generated by counting the number of people who appear in a monitoring region set on the captured moving image (operation S22). The generated counting data is stored in a second folder (operation S23). For example, the second folder may be the 'PeopleCounting' folder illustrated in FIG. 15.

It is determined whether a time fixed to capture a still image or a panorama image is reached (operation S24). If the fixed time is not reached, the method returns to operation S20, and the capturing of the moving image and the counting of people are repeated.

On the other hand, if the fixed time is reached, a still image is captured (operation S25), and the captured still image is stored in a third folder (operation S26). Also, a panorama image is captured (operation S27), and the captured panorama image is stored in a fourth folder (operation S28). For example, the third and fourth folders may be the 'StillImage' folder and the 'PanoramaImage' folder, respectively, as illustrated in FIG. 15.

It is determined whether a time fixed to transmit an email is reached (operation S29). If the fixed time is not reached, the method returns to operation S20, and the capturing of the moving image and the counting of people are repeated.

On the other hand, if the fixed time is reached, an email is transmitted to the monitoring server 201 by attaching the stored still image, the panorama image, and/or the counting data (operation S30).

Operation S30 for transmitting image and/or data will now be described in detail.

Referring to FIG. 18, if the time fixed to transmit an email is reached in operation S29, it is determined whether an external access to the remote management system 101 is blocked by a fire wall (operation S31). The determination may be performed when the remote management system 101 is installed or whenever an email is transmitted.

If the external access is not blocked, image and/or data is directly transmitted to the monitoring server 201 by using the local communication unit 138 (operation S36).

On the other hand, if the external access is blocked, a still image, a panorama image, and/or counting data are extracted from set paths and are attached to an email (operation S32). The email is transmitted to the mail server 700 to be downloaded to the monitoring server 201 (operation S33).

After the email is transmitted, it is determined whether the email is successfully transmitted (operation S34). If the transmission of the email fails, the method returns to operation S32 and the email is transmitted again. On the other hand, if the email is successfully transmitted, files of the transmitted image and/or data are deleted from corresponding folders (operation S35).

As such, in the monitoring system 2, the client 300 may remotely efficiently manage a plurality of stores by efficiently transmitting image and/or data from the remote management system 101 to the monitoring server 201.

A program for executing the above remote management method in the remote management system 101 can be stored in a recording medium, e.g., the local storage unit 132.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A remote management system comprising:
at least one camera which captures at least one of a moving image and a still image of a remote place;
a storage unit which stores the captured image;
a control unit which controls an operation of the at least one camera;
a counter unit which generates counting data by counting a number of people who appear in a monitoring region on the captured image; and
a communication unit which transmits to a device selectively the stored image or an email to which the stored image and the counting data is attached, and
wherein the control unit determines whether the communication unit is blocked to be accessed from the device by a fire wall when the remote management system is installed, and sets different methods of transmitting data according to a result of the determination,
wherein the control unit controls the communication unit to transmit the stored image and the counting data to a mail server by attaching the stored image and the counting data to the email if the communication unit is blocked to be accessed from the device, the mail server transmitting the email to the device, and to transmit the stored image and the counting data directly to the device if the communication unit is not blocked to be accessed from the device, and
wherein the control unit receives a schedule setting a time for capturing and storing the still image and a time for transmitting the stored still image and the counting data of a certain date, and controls the communication unit to selectively transmit the stored still image and the counting data of the certain date as an email attachment when the communication unit is blocked to be accessed from the device, according to the schedule.

2. The remote management system of claim 1, wherein the control unit deletes the transmitted image from the storage unit if the communication unit successfully transmits the stored image to the device or the email to which the stored image is attached to the device to the mail server.

3. The remote management system of claim 1, wherein the still image comprises a panorama image.

4. The remote management system of claim 1, wherein the at least one of the moving image and the still image is an image currently captured by the at least one camera in real time.

5. The remote management system of claim 1, wherein the control unit selects a method for transmitting the image stored in the storage unit to the device according to a size of the stored image.

6. A remote management method by using a remote management system, the remote management method comprising:
capturing at least one of a moving image and a still image of a remote place;
storing the captured image;
generating counting data by counting a number of people who appear in a monitoring region on the captured image;
determining whether access from a device to the stored image and the counting data is blocked by a fire wall when the remote management system is installed,
transmitting, by a mail transmitter of the remote management system, an email to which the stored image and the counting data is attached to a mail server, the mail server transmitting the email to the device, if the determining indicates that the access is blocked, transmitting the stored image and the counting data directly to the device, if the determining indicates that the access is not blocked, and receiving a schedule setting a time for capturing and storing the still image and a time for transmitting the stored still image and the counting data of a certain date, and selectively transmitting the stored still image and the counting data of the certain date as an email attachment when the access is blocked, according to the schedule.

7. The remote management method of claim 6, further comprising deleting the transmitted image if the stored image is successfully transmitted to the device or the email to which the stored image is attached is successfully transmitted to the mail server.

8. A monitoring device comprising:
a mail reception unit which receives an email, to which data is attached, transmitted from a mail server, the mail server receiving the email from a terminal of a remote place;
a communication unit which directly receives the data from the terminal, if the data is directly received without being attached to the email;
a storage unit which stores the data; and
a server which provides a management page for managing the remote place to a client, and transmits the data to the client according to a control signal received from the client,
wherein the data is received from the mail server by being attached to the email if it is determined that the monitoring device is blocked from accessing the terminal by a fire wall when the terminal is installed in the remote place, and
wherein the server provides a schedule to the terminal, the schedule setting a time for capturing and storing a still image and a time for transmitting the stored still image and a counting data of a certain date, such that the stored still image and the counting data of the certain date is selectively transmitted from the terminal as an email attachment when the monitoring device is blocked from accessing the terminal, according to the schedule.

9. The monitoring device of claim 8, wherein the data comprises at least one of a still image, a moving image, and counting data generated by counting a number of people who appear in a monitoring region.

10. The monitoring device of claim 9, wherein the data comprises each of the still image, the moving image, and the counting data generated by counting the number of people who appear in the monitoring region.

11. The monitoring device of claim 9, wherein the server transforms the counting data into a graph and transmits the graph to the client.

12. The monitoring device of claim 9, wherein the server provides a scheduler for selecting a time period to the client, and transmits to the client an image in the time period selected by using the scheduler from among the stored images.

13. The remote management system of claim 1,
wherein the schedule further sets a path of a folder from which the stored image is attached to the email and a time for transmitting the email, and controls the communication unit to transmit the email by attaching the stored image at the set time.

14. The remote management system of claim 1,
wherein the control unit receives a request for immediately sending the email, and controls the communication unit to transmit the email by attaching an image stored in a set folder.

* * * * *